Figure 1:
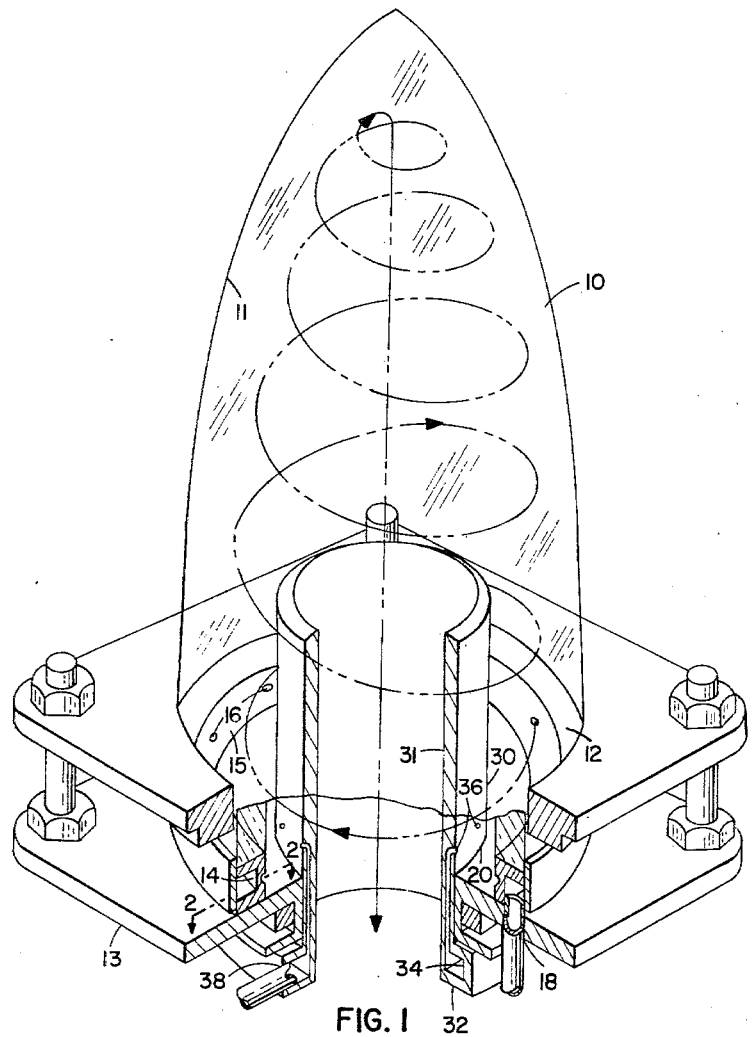

Aug. 10, 1965    J. W. CONNAUGHTON    3,199,295
CONICAL VORTEX INJECTION AND COMBUSTION
DEVICE FOR REACTION MOTORS
Filed Aug. 26, 1963

Joseph W. Connaughton,
*INVENTOR.*

BY Harry M. Saragovitz
Edward J. Kelly
Herbert Berl
James W. Adams, Jr.

3,199,295
CONICAL VORTEX INJECTION AND COMBUSTION DEVICE FOR REACTION MOTORS
Joseph W. Connaughton, Huntsville, Ala., assignor to the United States of America as represented by the Secretary of the Army
Filed Aug. 26, 1963, Ser. No. 304,700
2 Claims. (Cl. 60—39.74)
(Granted under Title 35, U.S. Code (1952), sec. 266)

The invention described herein may be manufactured and used by or for the Government for governmental purposes without the payment of any royalty thereon.

This invention relates to a device which functions as an injector and a combustion zone in reaction motors. More particularly, the invention relates to a conically shaped vortex device for use as a combination injector and combustion chamber in reaction motors.

In the operation of liquid-fueled rocket engines, the liquids are injected into the combustion chamber through a large number of ports in the injector device. With monopropellant engines, the injector assists in the atomization and vaporization of the liquid propellant to facilitate combustion. In bipropellant engines, the injector not only vaporizes and atomizes the liquid fuel and liquid oxidizer but also insures thorough mixing of the oxidizer and fuel to provide uniform combustion.

Conventional injectors are difficult to manufacture since the size and angle of the injection ports must be controlled to exacting specifications. A simple and efficient means of injecting propellants into the combustion chamber is, therefore, desirable.

It has now been determined that a relatively simple device accomplishes the atomization and/or vaporization and/or vaporization of liquid propellants as well as the thorough mixing thereof. The device is so constructed that it serves as the injector and combustion chamber for the rocket engine. Essentially, the device of the invention requires that at least one of two or more fluid propellants (that is, an oxidizer or fuel) be tangentially injected under pressure into the base of a conical chamber thereby causing a forward flow of fluid moving in a rotating direction (cyclonic or vortex flow) about the center axis of the cone. As the conical chamber narrows the velocity of the fluid flow increases until, theoretically, at the apex, the velocity is infinite. Injecting the fluid under pressure facilitates the vaporization and atomization in those cases where the injected fluid is liquid. A second propellant is simultaneously injected into the base of the conical chamber from an axial, tangential, or radial direction. The vortex flow of the tangentially injected fluid causes complete mixing, vaporization, and/or atomization of both propellants due to a shearing effect and the high velocity movement about the axis of the cone. The thoroughly mixed fluids then reverse their direction of flow and pass from the apex of the conical chamber along the center axis of the chamber and exhaust from the base. If the conical chamber is provided with an ignition means, combustion of the gases occurs within the chamber.

Another aspect of the present invention is its adaptation for use with hybrid propellants, that is, solid fuels and liquid or gaseous oxidizers. With hybrid propellants, the solid fuel grain is cast with a hollow conically shaped internal configuration. The oxidizer is then injected tangentially at the base of the hollow conical configuration.

In accordance with the foregoing, it is an object of the present invention to provide an injection device for reaction motors utilizing a vortex flow to provide for the mixing, vaporization, and/or atomization of fluid propellants.

It is a further object of the present invention to provide a device which serves as an injector and combustion chamber for liquid or gas fueled reaction motors.

A still further object of the present invention is to provide a conically shaped injection device for reaction motors wherein the conically shaped portion is also a combustion chamber.

Another object is to provide an efficient means for bringing a fluid oxidizer in contact with a solid propellant grain in hybrid fuel systems.

Figure 2:
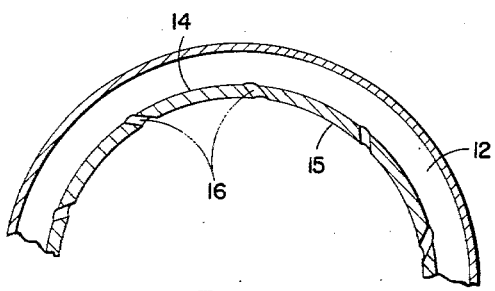

The manner in which these and other objects may be accomplished will become apparent from the following detailed discussion and drawings wherein:

FIGURE 1 is a perspective view partially in section of one embodiment of the invention; and FIGURE 2 is a sectional view of ring 12 taken along the traverse axis as indicated by line 2—2 of FIGURE 1.

The conical vortex injection and combustion device in its simplest form comprises a housing having a conical chamber disposed therein. The housing is closed at the end near the apex of the chamber and has a circular opening at the opposite end thereof. A sleeve or nozzle which has an opening or passage extending from end to end therethrough is rigidly fixed in the opening of the housing and extends into the chamber in the direction of the chamber apex. The walls of the housing near the base (that is, the end of chamber away from the apex) of the conical chamber has at least one passage disposed therein which extends around the entire circumference of the housing at the base of the chamber. A plurality of angular injection ports communicating between the passage and the chamber are located in the walls of the housing, these angular ports directing the incoming fluids in a tangential direction relative to the center axis of the chamber thereby causing a rotational flow about the center axis of the chamber towards the apex. (As used herein, the terminology "tangential direction" refers to a direction corresponding to a line parallel to a tangent drawn to a circle using the center axis of the chamber as the center of the circle. In other words, if lines were extended from the ports, they would be chords of the circle.) The size of these ports will depend on their number and the type of fluid injected but will generally range from 0.015 inch to 0.050 inch in diameter. An aperture is provided in the walls of the housing in communication with the passage for admitting fluids into the passage.

Additional fluids can be injected into the device by other passages in the walls of the housing similar to the one described above. The ports in any additional passage need not direct the injected fluid in an angular direction but can inject the fluid in a radial direction, that is, towards the center axis of the chamber. As previously mentioned, additional fluid could be injected into the device in an axial direction from one or more ports in either end of the chamber.

A very effective means of introducing additional fluids is through a passage in the wall of the cylindrical sleeve near the base of the chamber. A plurality of injection ports in the wall of the sleeve direct the fluid in a radial direction outward from the center axis at the base region of the conical chamber towards the walls of the housing. An aperture, or fluid supply port, communicating with the passage is provided in the walls of the sleeve to permit the entrance of fluids into the passage. Ordinarily the injection ports in the sleeve and those in the housing will be in substantially the same plane though this is not critical. It is obviously advantageous to bring all the fluids into contact as soon as possible to facilitate mixing.

Since conventional high-energy fluid propellants are ordinarily corrosive and burn at high temperatures, the device will be constructed of strong, heat-resistant materials, those metals generally employed in fabricating injection devices and combustion chambers, the stainless steels such as AISI 301 being illustrative. However, with less corrosive propellants other materials such as plastics and glass can be used. One particular device designed for burning a butane and air mixture in test motors utilized a transparent chamber of Pyrex glass (trademark for commercially available borosilicate glass).

The outer shape of the housing is not critical although it will generally conform to the internal conical configuration of the chamber. However, if desired, the housing can have an outward rectangular, cylindrical, or octagonal form and the like with a conical chamber disposed therein.

The cylindrical sleeve can be replaced with a nozzle of the converging-diverging type for greater efficiency. When this is done, the outer shape of the sleeve preferably remains cylindrical although the outer contours can conform to the internal shape of the converging-diverging nozzle.

The sleeve or nozzle should, preferably, extend into the chamber towards the apex to a point along the center axis corresponding to about one-fifth the distance (the distance being measured along the center-axis) from the injection plane of the fluid injected tangentially from the wall of the housing at the base of the chamber to the apex of the chamber. However, this distance can be varied to achieve optimum performance depending on the particular propellants and the size of the device.

The device of the present invention is used to propel missiles and space vehicles as the forces achieved through the combustion and expansion of the hot gases in the conical chamber imparts motion in the same manner as conventional reactor motors. Ignition is achieved in the usual manner such as hypergolic ignition, electric spark, pyrotechnic igniters and the like. However, if desired, the device can serve merely as an injection and mixing apparatus with the unburned gases being exhausted from the base into conventional combustion chambers.

As is known to those skilled in the art, propellant fluids are generally liquids. Moreover, in liquid fueled reaction motor systems, most fuels fall into either the bipropellant group or the monopropellant group. The present device can be utilized with both groups. However, the device is particularly suited for use with hypergolic bipropellant systems since mixing, atomization, and/or vaporization of the two components is much more thorough than with the conventional injection systems utilizing impinging streams.

The propellant particle injected tangentially has a tangential velocity at the injection plane, $V_1$, and an angular momentum of $mV_1\gamma_1$ where $m$ represents the mass of the particle and $\gamma_1$ is the distance from the center axis. If the injection velocity is constant, the angular momentum must be conserved: $mV_1\gamma_1 = mV_x\gamma_x = K$, and for unit mass $V_1\gamma_1 = V_x\gamma_x$, where $V_x$ and $\gamma_x$ are the velocity and distance from the axis at any point other than the injection plane. The gas particles introduced at the injection plane travel in a spiral motion down the cone with increasing angular velocity as $\gamma$ decreases. The relative motion of one plane to another moving towards the cone apex creattes high shear forces between the layers of gas particles in these planes. Any additional fluid particles coming into contact with this whirling flow of propellant particles is also subjected to the high shear forces. This shearing action promotes the thorough mixing of all propellant ingredients and insures the complete vaporization and/or atomization of these ingredients.

Referring now more particularly to the drawings, FIGURE 1 illustrates one detailed embodiment of the present invention. In this embodiment, the Pyrex glass housing 10 having a conical shaped chamber 11 disposed therein is rigidly attached at the base thereof to metal ring 12 which extends the entire circumference of the housing at the base of the chamber. The inner space or axial bore of ring 12 is designated opening 15 and is, in actuality, in registry with and forms a continuation of chamber 11. In fact, ring 12 could obviously be fabricated as an integral part of housing 10. Opening 15 is in communication with chamber 11. Metal plate 13 is rigidly fixed to ring 12 at the side of ring opposite the housing and extends uniformly into the chamber. A cylindrical opening 20 is disposed in plate 13 in communication with opening 15 of ring 12 and, thus, in communication with the chamber. Disposed in the metal ring is an annular passage 14 and a plurality of angular injection ports 16 communicating between the passage and the inner space or bore of the ring. An additional aperture, or fluid supply port, 18 is provided in the ring in communication with the passage to admit fluids into the passage. Rigidly disposed in opening 20, which is smaller in diameter than opening 15 in the ring (FIGURE 1), is a cylindrical metal sleeve 30 having an axial opening 31 from end to end therethrough and extending inwardly into the chamber towards the apex. An enlarged portion 32 which extends the entire circumference of the sleeve located in the end of the sleeve furtherest removed from the apex has a second annular passage 34 disposed therein. A plurality of injection ports 36 disposed in said sleeve communicates in a radial direction between the inner space of ring 12 and the second passage. Aperture 38 disposed in enlarged portion 32 in communication with the second passage provides for admission of fluids into the second passage.

FIGURE 2 is a sectional view taken along the transverse axis of ring 12 as indicated by line 2—2. This view shows more clearly the ports 16 illustrating their angular relationship to the inner space 15 of the ring. A line drawn along the center axis of one of these ports and extended until it intersected the ring would represent a chord of the circle (that is, the ring) equal in distance to nine-tenths of the radius. Fluids injected into the chamber through these ports are obviously moving in a tangential direction and, therefore, assume a rotational flow about the center axis of the chamber.

In actual use with a bipropellant system the oxidizer or fuel is injected under pressure and usually at a constant rate through the ports 16 while the remaining component is simultaneously injected under pressure through ports 36. In the swirling flow about the axis, the two components are thoroughly mixed, atomized, and/or vaporized so that combustion is uniform and complete. The hot combustion gases are then exhausted through the sleeve. If the oxidizer and fuel are not hypergolic, ignition means are located in the chamber. The flow of fluids is shown by the arrows in FIGURE 1.

The injection pressure and rate of flow for the fluids will depend on the particular propellants and the size of the device as they do in other conventional rocket engines. Routine procedures well known in the art can determine these factors for a given set of operating conditions.

If the present invention is adapted for use with hybrid systems as a hybrid motor, the housing is replaced with a cast solid fuel grain having an internal conical configuration. The external configuration can conform to the internal conical configuration or may have a cylindrical shape or any other desired form. The device shown in FIGURE 1 is readily adapted for use with hybrid systems by replacing the Pyrex glass housing 10 with such a cast solid propellant grain having a conical chamber therein. The remainder of the hardware in FIGURE 1, that is, ring 12, gate 13, sleeve 30, and so forth, would remain unchanged. The fuel grain is held rigidly in place by the outer walls of the missile or any other expedient means. A fluid oxidizer is then introduced through the angular ports in ring 12. As the oxidizer moves toward the cone tip, it comes into contact with the entire surface of the fuel grain. The ports in sleeve 30 could also be utilized to admit additional oxidizer or fuel into the chamber if desired or they could be eliminated along with passage 34. Conventional ignition means are utilized to initiate combustion. One means by which ignition could be achieved is by first injecting a butane-air mixture into the chamber and igniting this mixture. The fuel and oxidizer are ignited by the combustion of the butane-air mixture.

With a hybrid system, such oxidizers as red fuming nitric acid, dinitrogen tetraoxide, or liquid oxygen can be employed. Any of the fuel rich solid propellants known in the art can be cast into the appropriately shaped grain and utilized as a fuel. Examples of such propellant compositions are given in U.S. Patents 2,962,368; 2,997,376; and 2,967,098. Since an oxidizer is coming from outside these compositions, the amount of solid oxidizer incorporated therein can be greatly reduced or eliminated if desired and the amount of fuel components correspondingly increased. A cast grain made as directed in U. S. Patent 2,997,376 without the oxidizer component when used with red fuming nitric acid or liquid oxygen constitutes a satisfactory propellant combination for use in the present invention.

The above detailed description is for the purpose of illustration only and no undue limitation should be attributed to the invention as a result thereof except as reflected in the appended claims.

I claim:

1. A conical vortex injection and combustion device for reaction motors comprising, in combination:
   (a) an elongated housing having a closed end and an open end and a conical chamber disposed in said housing, said chamber being defined at one end by an apex disposed within the closed end of the housing and at the other end by a circular opening disposed concentrically within the open end of the housing;
   (b) a ring rigid with said open end of the housing and forming an extension thereof, said ring having an axial bore extending therethrough in registry with said circular opening of the chamber and thereby defining a continuation of said chamber in a direction away from the apex, said ring having an annular passage formed therein and a plurality of angular injection ports providing communication between said annular passage and the region of said chamber adjacent said other end, the direction of said ports being tangential to the central axis of said chamber, said ring further having a fluid supply port formed therein whereby fluids can be admitted to said angular passage; and,
   (c) an elongated, cylindrical sleeve rigidly positioned concentrically within said circular opening of the chamber with one end thereof extending inwardly into said chamber toward the apex thereof, said sleeve having a central opening extending from end to end therethrough and in communication with said chamber, said sleeve having a second annular passage formed in the sleeve and having a plurality of injection ports formed therein so as to provide communication between said second annular passage and said chamber in the area between said sleeve and said housing, said sleeve further having a fluid supply port formed therein whereby fluids can be admitted to said second annular passage.

2. A conical vortex injection and combustion device for reaction motors, said device comprising:
   (a) a housing having a conical chamber disposed therein and extending substantially the entire length thereof, said chamber being defined by a base and an apex opposite the base;
   (b) a metal ring rigidly affixed at one end thereof to said housing at the base of said chamber and having a first opening therethrough in communication with said chamber, said ring having an annular passage provided therein and a plurality of angular injection ports providing communication between said passage and said first opening, the direction of said injection ports being tangential to the center axis of said first opening, said ring further having a fluid supply port formed therein in communication with said passage whereby fluids can be admitted to said annular passage;
   (c) a metal plate in rigid relationship to the end of said ring opposite said one end, said plate having a second opening extending therethrough, said second opening being of a smaller diameter than said first opening; and,
   (d) a metal sleeve disposed within said second opening in rigid relationship with said plate, said sleeve extending through said first opening into said chamber and having an axial passage extending therethrough in communication with said chamber.

References Cited by the Examiner

UNITED STATES PATENTS

| 2,745,250 | 5/56 | Johnson et al. | 60—39.69 |
| 2,749,706 | 6/56 | Goddard | 60—39.74 X |
| 2,935,840 | 5/60 | Schoope | 60—39.74 X |
| 3,158,997 | 12/64 | Blackman et al. | 60—35.6 |

MARK NEWMAN, *Primary Examiner.*

SAMUEL LEVINE, *Examiner.*